Nov. 1, 1966  A. FRANKEL ET AL  3,282,561
TURBINE ROTORS

Filed Oct. 29, 1965  3 Sheets-Sheet 3 they are United States Patent Office 3,282,561
Patented Nov. 1, 1966

3,282,561
TURBINE ROTORS
Adolf Frankel, Altrincham, and George Jenson, Swinton, Manchester, England, assignors to Associated Electric Industries Limited, London, England, a British company
Filed Oct. 29, 1965, Ser. No. 505,631
Claims priority, application Great Britain, Dec. 14, 1964, 50,808/64
12 Claims. (Cl. 253—39)

This invention relates to improvements in turbine rotors and relates more particularly to bladed discs therefor.

A large steam turbine includes two or more cylinders in each of which the turbine rotor is provided with several circumferential rows of blades, each row of blades comprising a stage of the turbine. The roots of the blades of each row are secured to the periphery of a disc which is itself secured to or is integral with the rotor shaft.

An object of the invention is to provide an improved bladed disc integral with or suitable for the rotor of a turbine.

According to one aspect of the present invention, a bladed disc integral with or suitable for the rotor of a turbine comprises a disc having a circumferential row of radially extending blades, the periphery of the disc and the radially inner ends of the blades being formed severally with at least one circumferential groove and with a co-operating circumferential tongue the cross-sections of which permit the tongue to be inserted into the groove by a radial movement into a fitted position in which recesses formed in the sides of the grooves and in the sides of the tongue match to provide circumferentially extending channels into which are fitted members serving to lock the blades to the disc against radial movement, the members fitted into each channel constituting a hoop segmented to permit insertion of a segment of the hoop after a blade which it is to lock in place has been inserted radially into its fitted position, the circumferential extent of the blades being such that with all the blades in their fitted positions but at least some of the blades offset circumferentially from their final positions, the final segment of the hoop can be inserted in place, and locking means by which the blades, having been adjusted circumferentially to their final positions, can be retained in those positions against circumferential movement.

According to another aspect of the present invention, a bladed disc integral with or suitable for the rotor of a turbine comprises a disc having a circumferential row of radially extending blades, the periphery of the disc and the radially inner ends of the blades being formed severally with at least one circumferential groove and with a co-operating circumferential tongue the cross-sections of which permit the tongue to be inserted into the groove by a radial movement into a fitted position in which recesses formed in the sides of the grooves and in the sides of the tongue match to provide circumferentially extending channels into which fit members serving to lock the blades to the disc against radial movement, the members fitted into each channel constituting a segmented hoop one portion of which, having a length at least equal to the circumferential width of a blade root, can be left out during assembly to permit radial insertion of the blades, the circumferential extent of the blade roots being such that with all the blades in their correct radial positions but at least some of the blades offset circumferentially from their final positions, a gap is left at least equal to the circumferential width of a blade root, the one final portion of the hoop being inserted into that gap, and locking means by which the blades, having been adjusted circumferentially to their final positions, can be retained in those positions against circumferential movement.

Preferably the locking means are spacing members inserted between adjacent blades, arranged preferably so as to lock also the hoop segments against moving in the peripheral direction.

According to another aspect of the present invention, in a method of manufacture of a bladed disc integral with or suitable for the rotor of a turbine and comprising a disc having a circumferential row of radially extending blades, the periphery of the disc and the radially inner ends of the blades being formed severally with at least one circumferential groove and with a co-operating circumferential tongue the cross-sections of which permit the tongue to be inserted into the grooves by a radial movement into a fitted position in which recesses formed in the sides of the grooves and in the sides of the tongue match to provide circumferentially extending channels into which are fitted members serving to lock the blades to the disc against radial movement, the whole of the blades, or the whole of a group of blades, except the last blade in the group, are inserted radially into their fitted positions, the members fitted into the channel in the form of segments of a hoop, are inserted into the channels to lock these blades in their fitted positions, the blades being offset circumferentially from their final positions to permit the final blade to be fitted radially and then moved circumferentially to permit the final segment of the hoop to be inserted in place, the blades then being adjusted circumferentially to their final positions, and locking means then being applied by which the blades are retained in those positions against circumferential movement.

According to yet another aspect of the present invention in a method of manufacture of a bladed disc integral with or suitable for the rotor of a turbine and comprising a disc having a circumfrential row of radially extending blades, the periphery of the disc and the radially inner ends of the blades being formed severally with at least one circumferential groove and with a co-operating circumferential tongue the cross-sections of which permit the tongue to be inserted into the groove by a radial movement into a fitted position in which recesses formed in the sides of the grooves and in the sides of the tongue match to provide circumferentially extending channels into which fit members serving to lock the blades to the disc against radial movement, the members in the form of segments of a hoop are inserted into the recesses in the disc leaving a gap having a length at least equal to the circumferential width of a blade root, the blades are then inserted radially into this gap and slid round the circumference of the disc until all the blades are assembled on the disc but at least some of the blades are offset circumferentially from their final positions to permit the final segment of the hoop to be inserted in place, the blades then being adjusted circumferentially to their final positions, and locking means then being applied by which the blades are retained in those positions against circumferential movements.

The invention will now be described, by way of example, with reference to the accompanying drawings in which.

Figure 1:
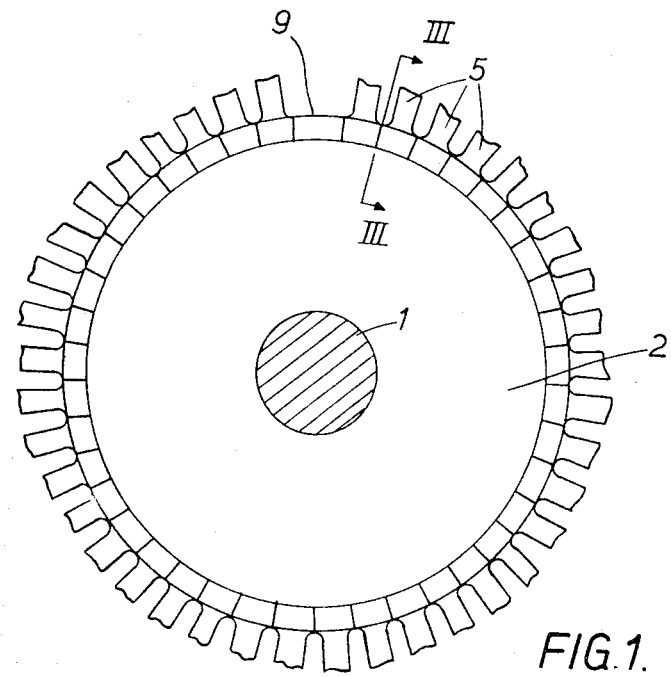
FIGURE 1 is a view of one bladed disc of a rotor of a steam turbine taken in an axial direction at a stage in the assembly when all the blades have been assembled on the disc.
Figure 2:
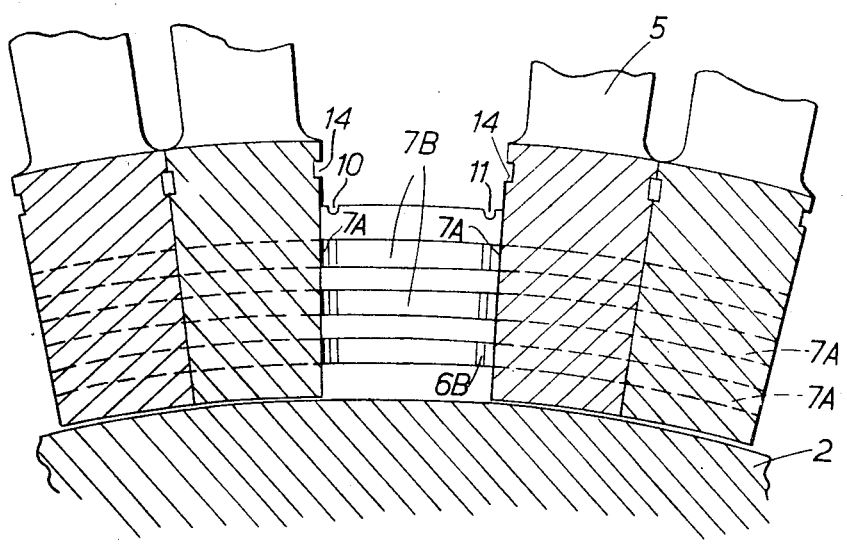
FIGURE 2 is a section taken on the line II—II in FIGURE 3 and showing four of the rotor blades.
Figure 3:
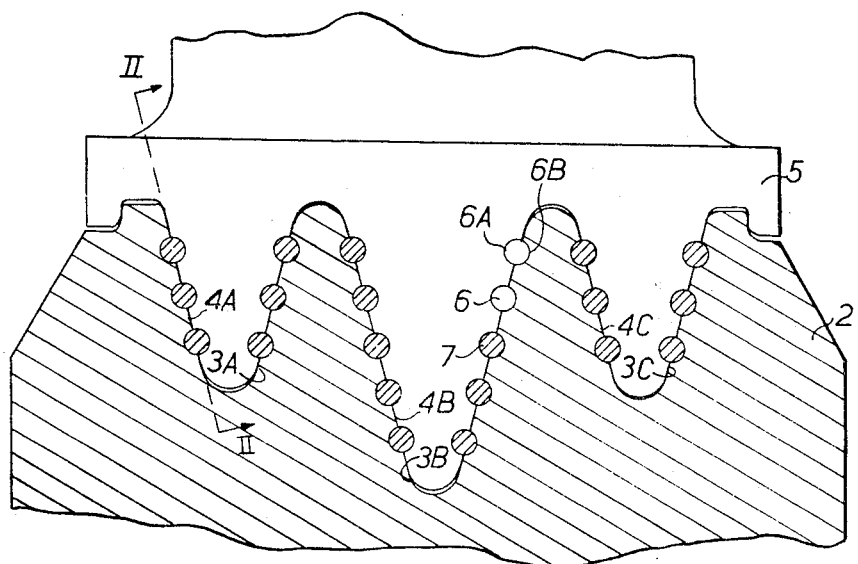
FIGURE 3 is a section taken on the line III—III in FIGURE 1.
Figure 4:
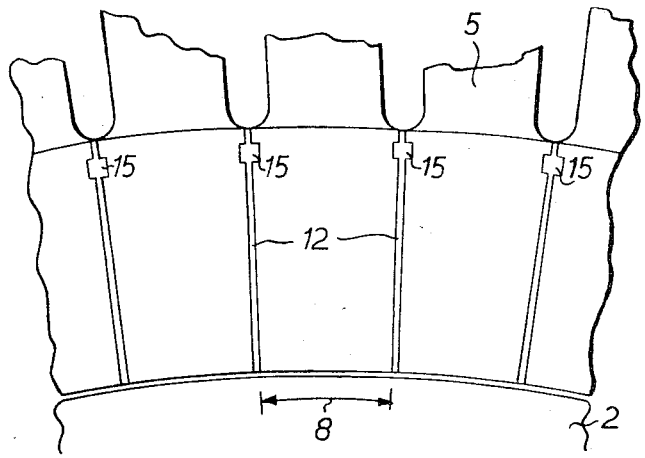
FIGURE 4 is a view of three of the rotor blades shown in FIGURE 1 but at a stage in the assembly subsequent to that depicted in FIGURE 1, and drawn to a larger scale than in that figure.
Figures 5A, 5B:
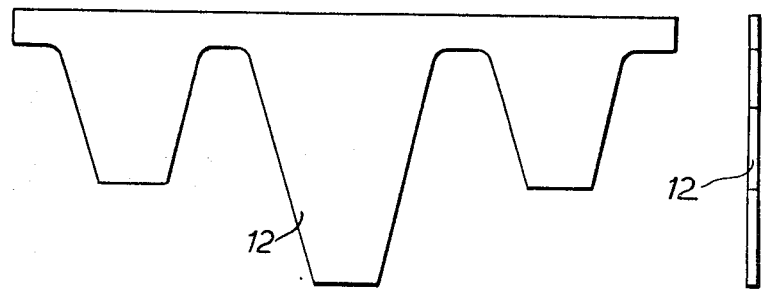
FIGURES 5a and 5b are respectively a side elevation and an end elevation of a locking plate shown in FIGURE 4.
Figures 6A, 6B:
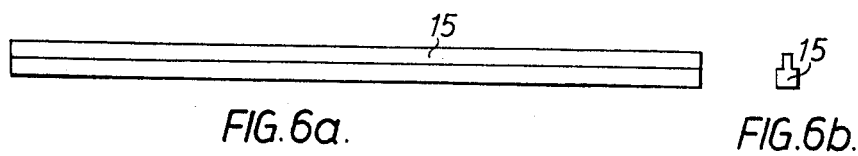
FIGURES 6a and 6b are respectively a side elevation and end view of a spacing member shown in FIGURE 4.

Referring first to FIGURES 1 to 6, a turbine rotor shaft 1 has secured to it a number of bladed discs of which one disc 2 is shown. The disc 2 is machined at its periphery to provide three substantially V-shaped circumferential grooves 3A, 3B and 3C into which fit respective V-shaped tongues 4A, 4B and 4C machined on the roots of the blades 5. The abutting sides of the tongues 4 and grooves 3 are provided with pairs of facing, substantially semicircular, recesses 6A and 6B, each pair of which are complementary to form a substantially circular aperture 6 extending around the whole circumference of the disc 2 and blade roots. These apertures 6 are arranged to receive locking rings 7 which are formed by two or more segments 7A, 7B of suitable length to enable the bladed disc to be assembled by the method which is described below. The roots of the blades 5 have pitch lengths 8 which are less than the circumference of the disc divided by the number of blades, by an amount sufficient to leave, when all the blades are assembled on the disc 2 as shown in FIGURE 1, a gate 9 of length somewhat greater than one blade pitch. The periphery of the disc is provided with two axially extending slots 10 and 11 spaced one blade pitch length apart and each arranged to receive a locking plate 12 shaped as shown in FIGURE 5. The roots of the blades are also provided in their abutting surfaces (see FIGURE 2) with substantially rectangular recesses 14 into which can be fitted blade spacing members 15 shown in FIGURE 6.

To assemble the bladed disc, a blade 5 is arranged on the periphery of the disc 2 with the tongues 4 engaging the grooves 3 and segments 7A of the locking rings are inserted in the apertures 6 to lock that blade to the periphery of the disc. Further blades 5 and segments 7A are then added until all the blades 5 are assembled on the periphery of the disc as shown in FIGURE 1 leaving the gate 9 at the position on the periphery of the disc containing the slots 10 and 11. The segments 7A are arranged to be of dimensions such that they terminate substantially flush with the circumferentially outermost sides of the two slots 10 and 11. Segments 7B are then inserted in recesses 6B these segments having a length such that their ends lie substantially flush with the circumferentially innermost sides of the two slots 10 and 11. A blade from one side of the gate 9 is then slid circumferentially along the tongues 4 and segments 7B so that the segments 7B lie within recesses 6A in that blade root. Locking plates 12 are then inserted in the slots 10 and 11 each locking plate 12 lying between adjacent ends of the segments 7A and 7B and restraining the blade 5 and the segments 7A and 7B from circumferential movement. The remainder of the blades 5 are slid circumferentially along the tongues 4 and segments 7A so that the blades are evenly distributed around the periphery of the disc, spacing members 15 being inserted in the recesses 14 between each two adjacent blades 5. The insertion of the last spacing member 15 securely locks all the blades to the disc, radial movement of the blades being prevented by the locking rings 7 and circumferential movement of the blades 5 and the segments 7 being prevented by the locking plates 12 and spacing members 15.

In an alternative method of assembling the bladed disc, the segments 7A are inserted in the recesses 6B leaving a gap at the position on the periphery of the disc containing the slots 10 and 11. A blade 5 is then inserted radially into this gap so that the tongues 4 engage the grooves 3, and the blade is slid circumferentially along the tongues 4 and segments 7A. The remainder of the blades 5 are then inserted in the same manner leaving the gate 9 at the position on the periphery of the discs containing the slots 10 and 11. The segments 7B are then inserted in recesses 6B and a blade 5 from one side of the gate 9 is then slid circumferentially along the tongues 4 and segments 7B so that the segments 7B lie within recesses 6A in that blade root. Locking plates 12 are then inserted in the slots 10 and 11 and the remainder of the blades are adjusted circumferentially and spacing members 15 inserted in the recesses 14. The insertion of the last spacing member 15 securely locks all the blades to the disc, radial movement of the blades being prevented by the locking rings 7 and circumferential movement of the blades being prevented by locking plates 12 and spacing members 15.

Figure 7:
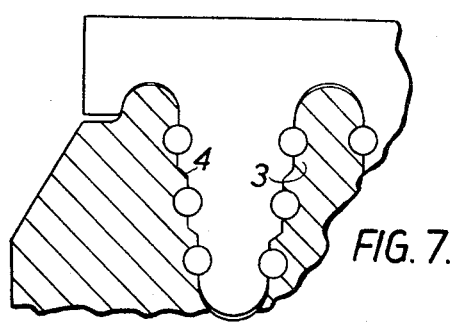
FIGURE 7 is a fragmentary view of an alternative embodiment of the invention showing a different shape for the grooves and the tongues on the blade roots and the disc.

In an alternative arrangement the sides of the tongues 4 and the sides of the grooves 3 may have a zig-zag or stepped shape as shown in FIGURE 7.

A bladed disc in accordance with the invention is advantageous in that all the blades and all positions on the periphery of the disc are uniformly stressed, there being no closing blade which usually is of different design to the remainder. Moreover the periphery of the disc has no parasitic adle mass as in other blade fastenings having pin or serrated roots.

What we claim is:

1. A bladed disc of a rotor of a turbine comprising:
   (a) a disc;
   (b) a circumferential row of blades extending radially from the disc;
   (c) at least one circumferential tongue and a co-operating circumferential groove provided on the periphery of the disc and the radially inner ends of the blades, the tongue and groove having cross-sections which permit the tongue to be inserted into the groove by a radial movement into a fitted position;
   (d) recesses formed in the sides of the groove and in the sides of the tongue which match to provide circumferentially extending channels for receiving members serving to lock the blades to the disc against radial movement;
   (e) locking members fitted into each channel constituting a hoop segmented to permit insertion of a segment of the hoop after a blade which it is to lock into place has been inserted radially into its fitted position, the circumferential extent of the blades being such that with all the blades in their fitted positions but at least some of the blades offset circumferentially from their final positions, the final segment of the hoop can be inserted in place; and
   (f) locking means by which the blades, having been adjusted circumferentially to their final positions, can be retained in those positions against circumferential movement.

2. A bladed disc as claimed in claim 1, wherein the locking means are spacing members inserted between adjacent blades.

3. A bladed disc as claimed in claim 1, wherein the locking means are arranged to lock the hoop segments against moving in the peripheral direction.

4. A bladed disc as claimed in claim 1, wherein the recesses are substantially semicircular and match to form substantially circular circumferentially extending channels which receive hoop segments of circular cross-section.

5. A bladed disc as claimed in claim 1, wherein the circumferential tongue and co-operating circumferential groove are substantially V-shaped.

6. A bladed disc of a rotor of a turbine comprising:
   (a) a disc;
   (b) a circumferential row of blades extending radially from the disc;
   (c) at least one circumferential tongue and a co-operating circumferential groove provided on the periphery of the disc and the radially inner ends of the blades, the tongue and the groove having cross-sections which permit the tongue to be inserted into the groove by a radial movement into a fitted position;

(d) recesses formed in the sides of the groove and in the sides of the tongue which match to provide circumferentially extending channels for receiving members serving to lock the blades to the disc against radial movement;

(e) locking members fitted into each channel constituting a segmented hoop one portion of which, having a length at least equal to the circumferential width of a blade root, can be left out during assembly to permit radial insertion of the blades, the circumferential extent of the blade roots being such that with all the blades in their correct radial positions but at least some of the blades offset circumferentially from their final positions, a gap is left at least equal to the circumferential width of a blade root, the one final portion of the hoop being inserted into that gap; and (f) locking means by which the blades, having been adjusted circumferentially to their final positions, can be retained in those positions against circumferential movement.

7. A bladed disc as claimed in claim 6, wherein the locking means are spacing members inserted between adjacent blades.

8. A bladed disc as claimed in claim 6, wherein the locking means are arranged to lock the hoop segments against moving in the peripheral direction.

9. A bladed disc as claimed in claim 6, wherein the recesses are substantially semicircular and match to form substantially circular circumferentially extending channels which receive hoop segments of circular cross-section.

10. A bladed disc as claimed in claim 6, wherein the circumferential tongue and co-operating circumferential groove are substantially V-shaped.

11. A methd of manufacturing a bladed disc of a rotor of a turbine comprising the steps of:

(a) providing a disc and a circumferential row of radially extending blades;

(b) forming the periphery of the disc and the radially inner ends of the blades severally with at least one circumferential tongue and with a co-operating circumferential groove the cross-sections of which permit the tongue to be inserted into the groove by a radial movement into a fitted position;

(c) forming recesses in the sides of the tongue and in the sides of the groove which match to provide circumferentially extending channels for receiving members serving to lock the blades to the disc against radial movement;

(d) inserting radially into their fitted positions the whole of the blades, or the whole of a group of blades except the last blade of the whole or the group;

(e) inserting into each channel locking members in the form of segments of a hoop, the blades being offset circumferentially from their final positions to permit the last blade to be fitted radially;

(f) fitting the last blade and then moving it circumferentially to permit the final segment of the hoop to be inserted in place;

(g) inserting the final segment of the hoop and adjusting the blades circumferentially to their final positions;

(h) and applying locking means by which the blades are retained in their final positions against circumferential movement.

12. A method of manufacturing a bladed disc of a rotor of a turbine comprising the steps of:

(a) providing a disc and a circumferential row of radially extending blades;

(b) forming the periphery of the disc and the radially inner ends of the blades severally with at least one circumferential tongue and with a co-operating circumferential groove the cross-sections of which permit the tongue to be inserted into the groove by a radial movement into a fitted position;

(c) forming recesses in the sides of the tongue and in the sides of the groove which match to provide circumferentially extending channels for receiving members serving to lock the blades to the disc against radial movement;

(d) inserting into the recesses in the disc locking members in the form of segments of a hoop leaving a gap having a length at least equal to the circumferential width of a blade root;

(e) inserting the blades radially into this gap and sliding them round the circumference of the disc until all the blades are assembled on the disc but at least some of the blades are offset circumferentially from their final positions to permit the final segment of the hoop to be inserted in place;

(f) inserting the final segment of the hoop and adjusting the blades circumferentially to their final positions;

(g) and applying locking means by which the blades are retained in these final positions against circumferential movement.

References Cited by the Examiner
UNITED STATES PATENTS

| | | | |
|---|---|---|---|
| 977,300 | 11/1910 | Haines | 253—77 |
| 1,059,618 | 4/1913 | Knight | 253—77 |
| 1,362,074 | 12/1920 | Baumann. | |
| 2,430,185 | 11/1947 | Prescott | 253—77 |
| 2,916,257 | 12/1959 | Poellmitz et al. | 253—77 |

MARTIN P. SCHWADRON, *Primary Examiner.*

E. A. POWELL, JR., *Assistant Examiner.*